United States Patent
Kennedy

(10) Patent No.: US 10,432,576 B2
(45) Date of Patent: Oct. 1, 2019

(54) USER DEVICE TO DOMAIN NAME RESOLVER MAPPING

(71) Applicant: Instart Logic, Inc., Mountain View, CA (US)

(72) Inventor: Brian Kennedy, Mountain View, CA (US)

(73) Assignee: Instart Logic, Inc., Palo Alto, CA (US)

(*) Notice: Subject to any disclaimer, the term of this patent is extended or adjusted under 35 U.S.C. 154(b) by 338 days.

(21) Appl. No.: 14/309,492

(22) Filed: Jun. 19, 2014

(65) Prior Publication Data

US 2015/0372972 A1    Dec. 24, 2015

(51) Int. Cl.
*G06F 15/16* (2006.01)
*H04L 29/12* (2006.01)

(52) U.S. Cl.
CPC ........ *H04L 61/1511* (2013.01); *H04L 61/103* (2013.01); *H04L 61/609* (2013.01)

(58) Field of Classification Search
CPC ... H04L 61/1511; H04L 61/103; H04L 61/609
See application file for complete search history.

(56) References Cited

U.S. PATENT DOCUMENTS

| | | | | |
|---|---|---|---|---|
| 6,154,777 A | * | 11/2000 | Ebrahim | H04L 29/12066 709/227 |
| 6,789,125 B1 | * | 9/2004 | Aviani | H04L 29/12066 709/238 |
| 9,118,680 B1 | * | 8/2015 | Dunlap | H04L 67/1008 |
| 2007/0226294 A1 | * | 9/2007 | Pruitt | H04L 29/12113 709/203 |
| 2014/0149552 A1 | * | 5/2014 | Carney | H04L 67/32 709/219 |
| 2014/0244730 A1 | * | 8/2014 | Wyatt | H04L 61/1511 709/203 |
| 2014/0344400 A1 | * | 11/2014 | Varney | H04L 45/745 709/217 |

* cited by examiner

*Primary Examiner* — Suraj M Joshi
*Assistant Examiner* — Jaren Means
(74) *Attorney, Agent, or Firm* — Van Pelt, Yi & James LLP

(57) ABSTRACT

A method of selecting an edge proxy server to serve web contents to user devices is disclosed. Domain name system (DNS) queries from a domain name resolver are received. A mapping between the domain name resolver and a corresponding list of user devices served by the domain name resolver are created based on the received DNS queries. A transformed geographical location representing the domain name resolver is determined based on the mapping. An edge proxy server is selected in response to a future DNS query received from the domain name resolver based at least in part on the transformed geographical location of the domain name resolver.

19 Claims, 7 Drawing Sheets

Script

USER DEVICE TO DOMAIN NAME RESOLVER MAPPING

BACKGROUND OF THE INVENTION

The closer geographically an edge proxy server is to a user device, the faster the content will be delivered to the user. It is desirable, then, that the edge proxy server selected to serve the content of a website to a user be the one that is closest geographically to the user.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The Domain Name System (DNS) is a hierarchical distributed naming system for computers, services, or any resource connected to the Internet or a private network. It associates information from domain names with each of the assigned entities. It translates domain names to the numerical IP addresses needed for locating computer services and devices worldwide. For example, a domain name www.example.com translates to the addresses 93.184.216.119 (IPV4) and 2606:2800:220:6d:26bf:1447:1097:aa7 (IPV6).

Figure 1:
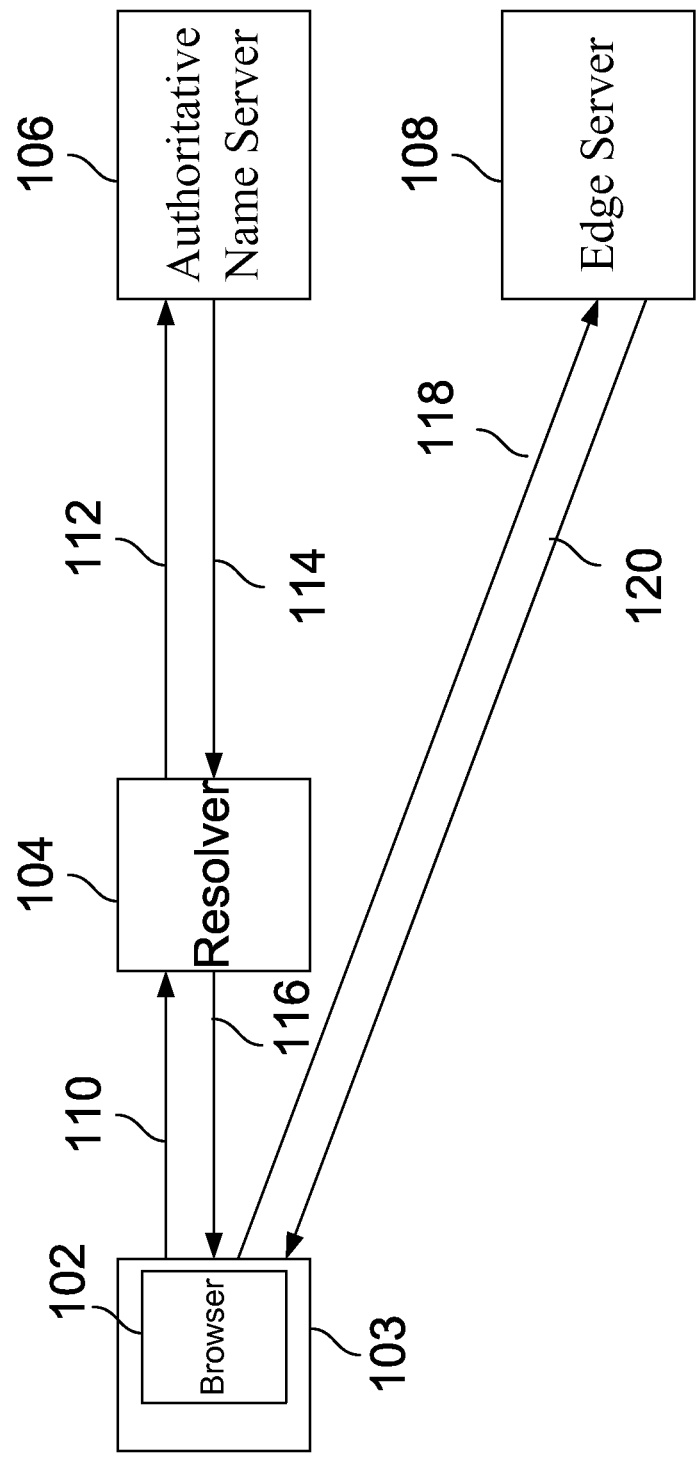
FIG. 1 is a block diagram illustrating an embodiment of a web browser obtaining an IP address for accessing a website using the domain name system (DNS).

FIG. 1 is a block diagram illustrating an embodiment of a web browser obtaining an IP address for accessing a website using the domain name system (DNS). The block diagram includes a web browser 102 running on a user device 103, a domain name resolver 104, an authoritative name server 106, and an edge proxy server 108 serving the content of the website.

As shown in FIG. 1, web browser 102 runs on user device 103. Web browser 102 may run on different types of devices, including laptop computers, desktop computers, tablet computers, smartphones, and other mobile devices. To access a website (e.g., www.xyz.com), web browser 102 sends a query 110 to domain name resolver 104, requesting domain name resolver 104 to translate www.xyz.com to its corresponding IP address. Domain name resolver 104 may be managed by a company or an Internet Service Provider (ISP). It is responsible for initiating and sequencing the queries to name server(s) that ultimately lead to a full resolution (translation) of the resource sought, e.g., translation of a domain name into an IP address.

In response to query 110, domain name resolver 104 sends a query 112 to authoritative name server 106, a name server that gives answers in response to questions asked about names in a zone. Authoritative name server 106 then sends the IP address (e.g., 10.0.0.5) corresponding to www.xyz.com back to domain name resolver 104 in an answer message 114. Domain name resolver 104 then sends the IP address obtained from authoritative name server 106 to web browser 102 in an answer message 116. Web browser 102 may now access the website by connecting to edge proxy server 108 of a CDN (content delivery network) at the IP address 10.0.0.5, as shown by arrows 118 and 120.

The closer geographically the edge proxy server is to the user, the faster the content will be delivered to the user. Therefore, the edge proxy server that is selected to serve the content of the website to the user should ideally be the one that is closest geographically to the user. However, this condition may not be met in some cases. For example, when authoritative name server 106 receives query 112 from domain name resolver 104, authoritative name server 106 cannot determine the user's geographical location (e.g., San Jose) by translating the IP address of user device 103 to a geographical location using geolocation software, because the IP address of user device 103 is masked by domain name resolver 104. In particular, when authoritative name server 106 receives query 112, the client IP address is the IP address of domain name resolver 104, as opposed to the IP address of user device 103. Authoritative name server 106 may translate the IP address of domain name resolver 104 into a geographical location and select an edge proxy server that is closest to domain name server 104 to serve the web content to the user. However, the selected edge proxy server may not be the closest edge proxy server to the user. For example, if domain name server 104 is located in San Francisco, while the user is located in San Jose, then authoritative name server 106 would think that the user is located in San Francisco, and as a result it will select an edge proxy server in San Francisco or closest to San Francisco (but not in San Jose or closest to San Jose), resulting in a higher-latency connection between the edge proxy server and the user.

Extension mechanisms of DNS (EDNS) is an experimental DNS extension that allows a DNS resolver to pass the user device's IP address to a compatible authoritative name server. The authoritative name server can then use this information to better determine where the user device is. However, because of the experimental nature of the standard, EDNS is not widely adopted. If EDNS is not supported by the domain name server, then an authoritative name server that supports EDNS still cannot determine the geographical location of the user device and, as a result, the selection of the closest edge proxy server to the user device cannot be optimized.

In the present application, a system and process for selecting an edge proxy server that can provide lower-latency connections to a plurality of user devices for accessing web content are disclosed. The selection of the edge proxy server is based on the geographical locations of the plurality of user devices and the geographical locations of a plurality of edge proxy servers to select from. In some embodiments, the process includes three phases, as will be described in greater detail below.

Figure 2:
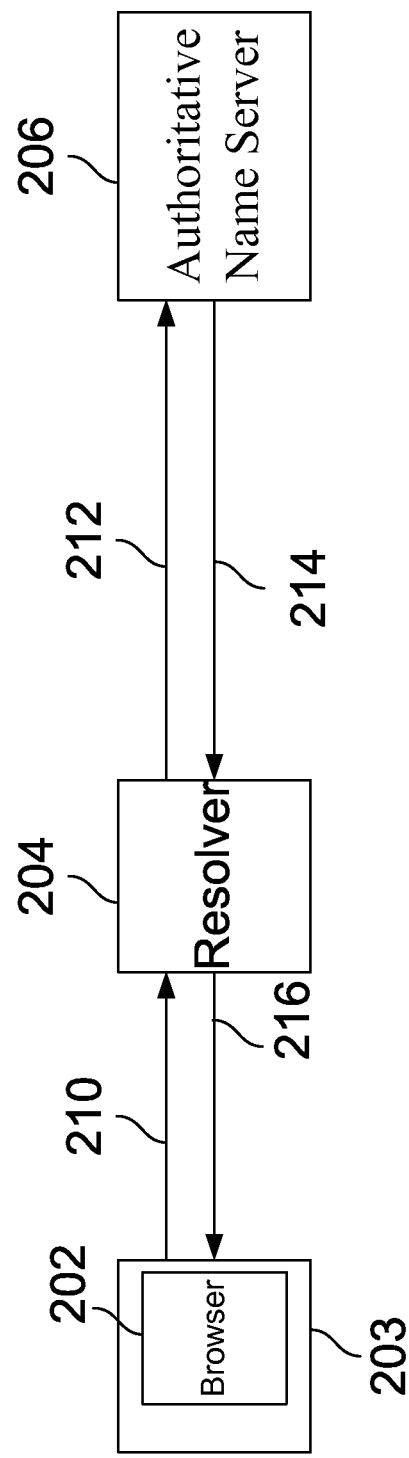
FIG. 2 is a block diagram illustrating an embodiment of a system for selecting an edge proxy server that can provide lower-latency connections to a plurality of user devices for accessing web content during phase 1.

FIG. 2 is a block diagram illustrating an embodiment of a system for selecting an edge proxy server that can provide lower-latency connections to a plurality of user devices for accessing web content during phase 1. The block diagram includes a web browser 202 running on a user device 203, a domain name resolver 204, and an authoritative name server 206. FIG. 2 illustrates the messages that are sent between the different blocks of the system during phase 1.

As shown in FIG. 2, web browser 202 runs on user device 203. Web browser 202 may run on different types of devices, including laptop computers, desktop computers, tablet computers, smartphones, and other mobile devices. To access a website (e.g., www.xyz.com), web browser 202 sends a query 210 to domain name resolver 204, requesting domain name resolver 204 to translate www.xyz.com to its corresponding IP address. Domain name resolver 204 may be managed by a company or an Internet Service Provider (ISP). It is responsible for initiating and sequencing the queries to name server(s) that ultimately lead to a full resolution (translation) of the resource sought, e.g., translation of a domain name into an IP address.

In response to query 210, domain name resolver 204 sends a query 212 to authoritative name server 206, a name server that gives answers in response to questions asked about names in a zone. Authoritative name server 206 then sends the IP address (e.g., 10.0.0.5) corresponding to www.xyz.com back to domain name resolver 204 in an answer message 214. Domain name resolver 204 then sends the IP address obtained from authoritative name server 206 to web browser 202 in an answer message 216. Web browser 202 may next access the website by connecting to an edge proxy server (not shown in FIG. 2) at the IP address 10.0.0.5. Note that at this initial phase 1, the edge proxy server selected by authoritative name server 206 may not be geographically closer to user device 203 than other edge proxy servers in the CDN network.

Figure 3:
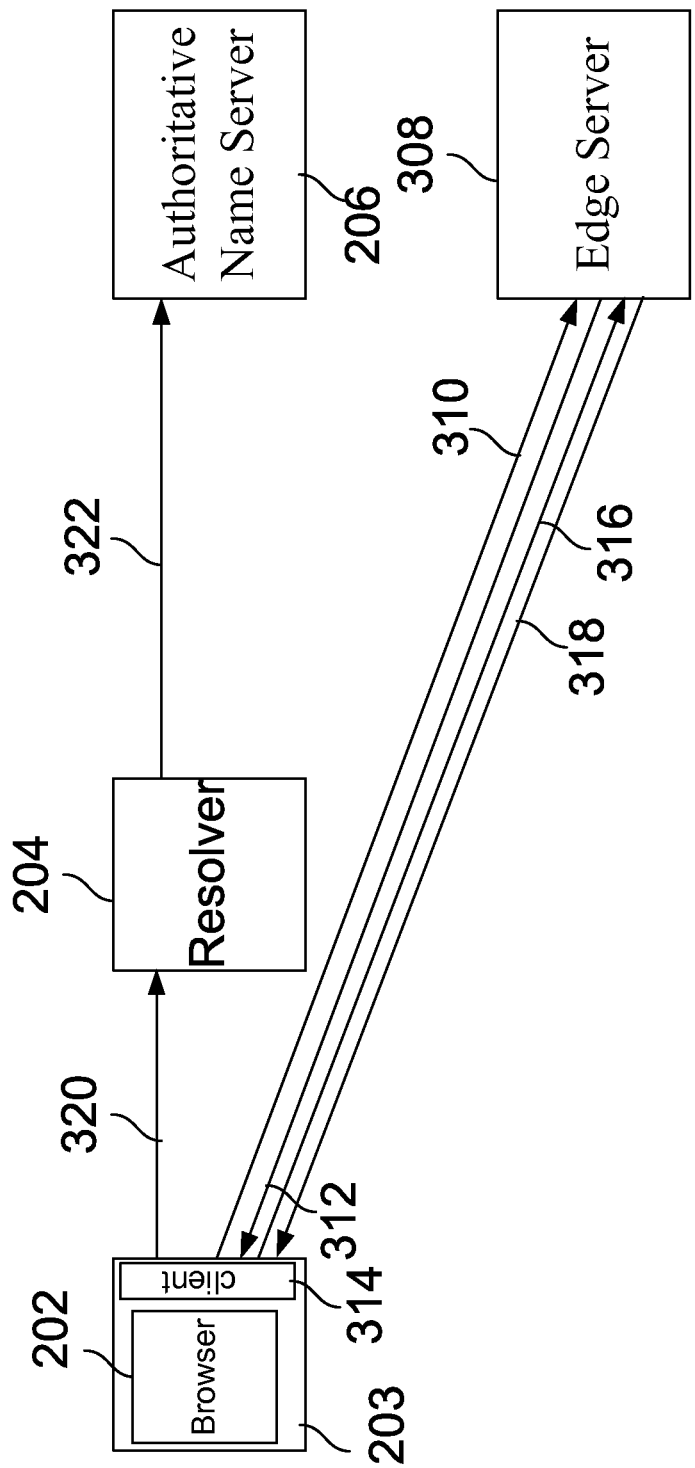
FIG. 3 is a block diagram illustrating an embodiment of a system for selecting an edge proxy server that can provide lower-latency connections to a plurality of user devices for accessing web content during phase 2.

FIG. 3 is a block diagram illustrating an embodiment of a system for selecting an edge proxy server that can provide lower-latency connections to a plurality of user devices for accessing web content during phase 2. The block diagram includes a web browser 202 running on a user device 203, a domain name resolver 204, an authoritative name server 206, and an edge proxy servers 308. FIG. 3 includes the messages that are sent between the different blocks of the system during phase 2.

Figure 4:
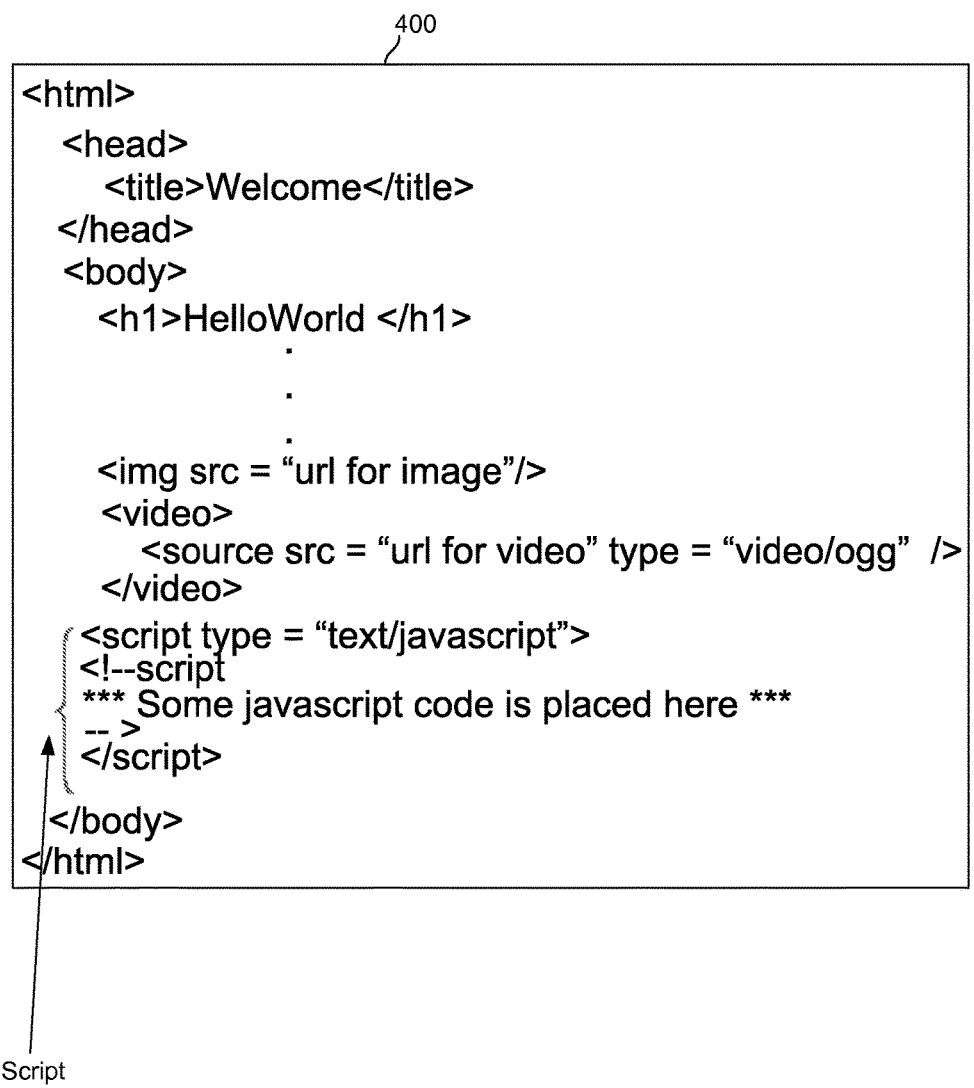
FIG. 4 is a diagram illustrating an embodiment of a webpage 400 described by an HTML file.

As shown in FIG. 3, web browser 202 next accesses the website by connecting to an edge proxy server 308 at the IP address 10.0.0.5, as shown by arrow 310. A webpage accessed by web browser 202 may be described by different markup languages, including Hypertext Markup Language (HTML), Extensible Markup Language (XML), and the like. The webpage may also be described by different scripting languages, including JavaScript Object Notation (JSON), and the like. The webpage may be described by other custom languages as well. HTML is used hereinafter as an example of the various languages for describing webpages. Note that the examples of HTML are selected for illustration purposes only; accordingly, the present application is not limited to these specific examples. FIG. 4 is a diagram illustrating an embodiment of a webpage 400 described by an HTML file.

With continued reference to FIG. 3, to display the webpage, web browser 202 sends a Hypertext Transfer Protocol (HTTP) request message 310 to edge proxy server 308 requesting the HTML webpage file. After edge proxy server 308 locates the requested HTML webpage file, edge proxy server 308 injects a nanovisor client into the HTML webpage file, and then sends a response 312 back to web browser 202. In some embodiments, the nanovisor client may be injected by adding JavaScript client code in the head section of the HTML webpage file. In some embodiments, nanovisor client 314 resides within the execution environment for web browser 202 and virtualizes the code running within the execution environment. In some embodiments, nanovisor client 314 may be a piece of software that is running outside of web browser 202. In some embodiments, nanovisor client 314 may be integrated as part of the code of web browser 202.

With continued reference to FIG. 3, nanovisor client 314 sends a request 316 to edge proxy server 308 requesting edge proxy server 308 to send a unique identification token (UID) to nanovisor client 314. The unique identification token is a unique identifier of user device 203. In some embodiments, the unique identification token is the IP address of user device 203. Nanovisor client 314 requests edge proxy server 308 to send the IP address of user device 203 because nanovisor client 314 may not be able to obtain the IP address locally, for example via web browser 202 or other local interfaces. In some embodiments, the unique identification token is a unique identifier that is converted from the IP address of user device 203. The unique identification token can be converted back to the IP address of user device 203 with a known key, for example. In some embodiments, the unique identification token is provided by a service (e.g., /instart/api/get-client-ip) running on edge proxy server 308, and the token is sent to nanovisor client 314 in a response 318.

After nanovisor client 314 receives the unique identification token, nanovisor client 314 encodes the unique identification token such that it can be part of a domain name. For example, if the unique identification token is the IP address 10.0.0.1 of user device 203, then the encoded UID may be a big-endian hexadecimal string 0a000001. The hexadecimal string is then encoded into a domain name (e.g., ip-0a000001.dnsmap.insnw.net). Nanovisor client 314 then initiates a request to fetch a resource from the given domain, which triggers web browser 202 to send a DNS query 320 for the domain name to domain name resolver 204.

In response to query 320, domain name resolver 204 sends a query 322 to authoritative name server 206, requesting authoritative name server 206 to translate the domain name. Since the encoded UID 0a000001 is encoded into the domain name ip-0a000001.dnsmap.insnw.net, authoritative name server 206 may extract 0a000001 from the domain name and then decode 0a000001 to obtain the IP address 10.0.0.1 of user device 203. Authoritative name server 206 can also obtain the IP address of domain name resolver 204 from query 322. Combining the user device IP address and the resolver IP address, authoritative name server 206 may create a mapping between the two, which may be used to select an edge proxy server that can provide lower-latency connections to a plurality of user devices for accessing web content. In particular, as authoritative name server 206 receives DNS queries from different domain name servers, each serving many user devices, a mapping between each resolver and a corresponding list of user devices that are serviced by the resolver can be obtained. In some embodiments, the user device IP address and the resolver IP address are logged in a log file, and an asynchronous log processing job may be used to process the log file and create the mapping.

Figure 5:
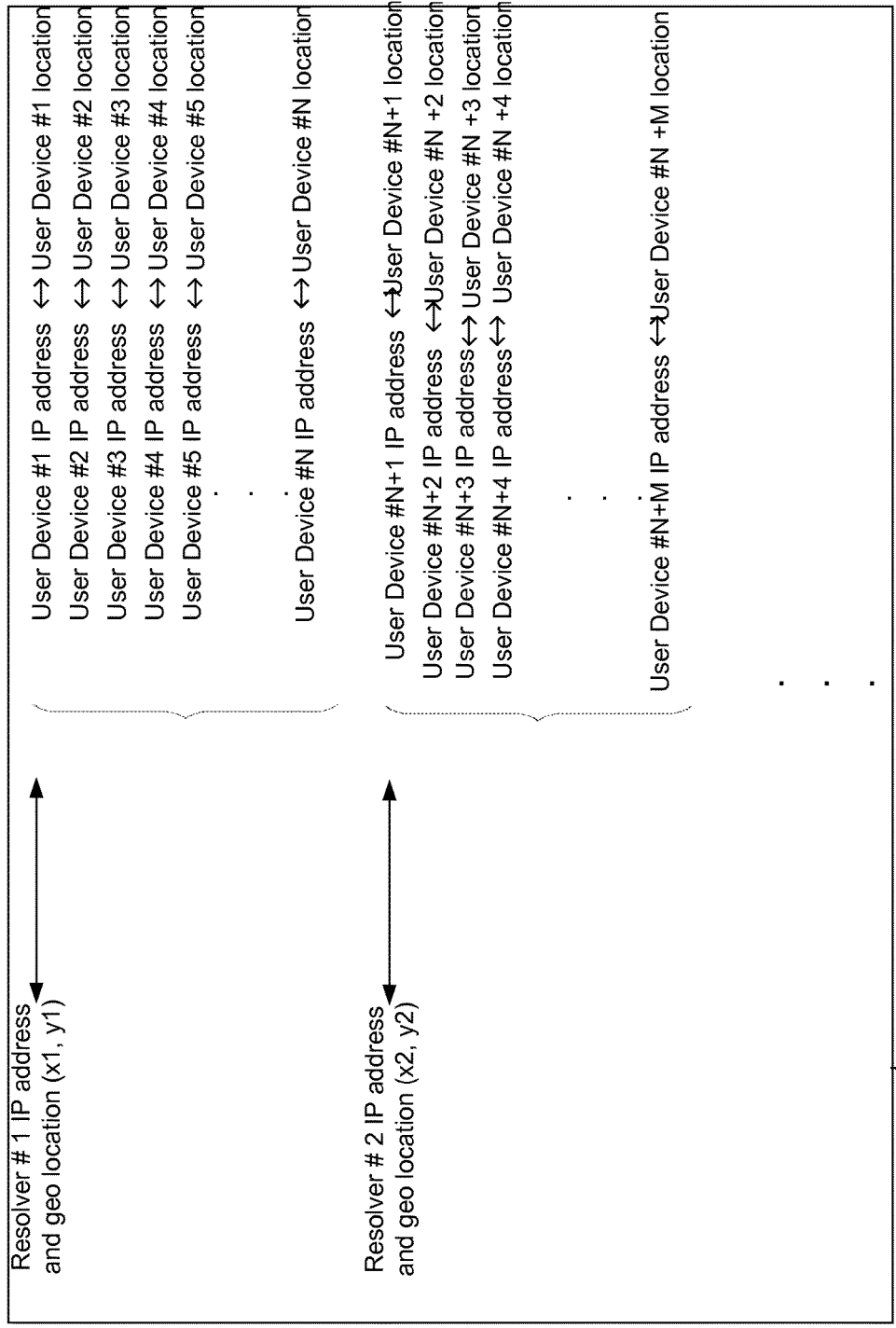
FIG. 5 illustrates an embodiment of a mapping 500 between each resolver and a corresponding list of user devices that are serviced by the resolver.

FIG. 5 illustrates an embodiment of a mapping 500 between each resolver and a corresponding list of user devices that are serviced by the resolver. As shown in FIG. 5, for each domain name resolver, there is stored an IP address of the domain name resolver and the IP address's corresponding geographical location, which can be determined using geolocation software, e.g., MaxMind. In addition, for each domain name resolver, there is a list of user devices that are serviced by the domain name resolver. Both the IP address and the geographical location of each user device may be recorded in mapping 500. The geographical location of the user device may be translated from the IP address of the user device using geolocation software.

Figure 6:
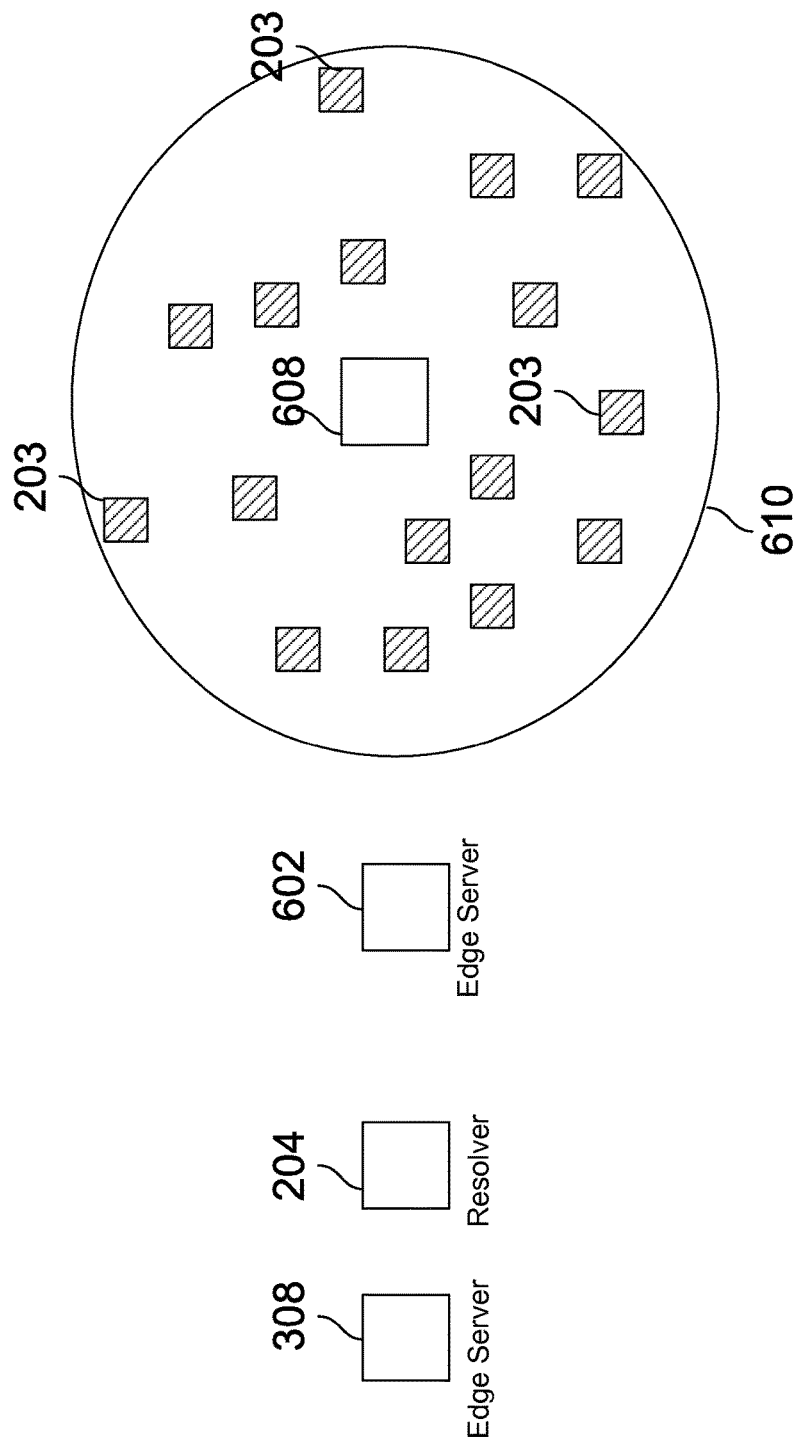
FIG. 6 is a diagram illustrating that a plurality of user devices 203 are serviced by domain name server 204 and that an edge proxy server (308) that is closest to the resolver may not be the closest edge proxy server (602) to the user devices 203.

FIG. 6 is a diagram illustrating that a plurality of user devices 203 are serviced by domain name server 204 and that an edge proxy server (308) that is closest to the resolver may not be the closest edge proxy server (602) to the user devices 203.

In phase 3, mapping 500 may be used to determine a transformed geographical location 608 representing domain name resolver 204 such that the transformed geographical location may be used to better select an edge proxy server that can provide lower-latency connections to the plurality of user devices for accessing web content. As shown in FIG. 6, suppose that domain name resolver 204 has an actual geographical location of (x1, y1). The transformed geographical location 608 may then have a geographical location of (x1', y1'), which is based on the geographical locations of the user devices that the resolver serves. For example, (x1', y1') may be a weighted average of the geographical locations of all the user devices 203. In this example, (x1, y1) can be obtained from mapping 500, and (x1', y1') can be determined by calculating the weighted average of all the user device locations mapped to resolver #1 (i.e., user device #1 location, user device #2 location, . . . user device #N location). In another example, the transformed geographical location may be characterized by a center point and a radius around it, as shown by circle 610 in FIG. 6. Transformed geographical location 608 can be used to update a GEO IP database. The next time when a DNS query from a particular resolver is received by the authoritative name server, the authoritative name server may then use the transformed geographical location 608 of the resolver to select a closest edge proxy server to serve the web content. For example, an edge proxy server that is geographically closer to transformed geographical location 608 is selected. Referring back to FIG. 6, a user device 203 that is served by domain name resolver 204 will be connected now to edge server 602 instead of edge server 308, thereby reducing the latency between the user device and the CDN network.

Figure 7:
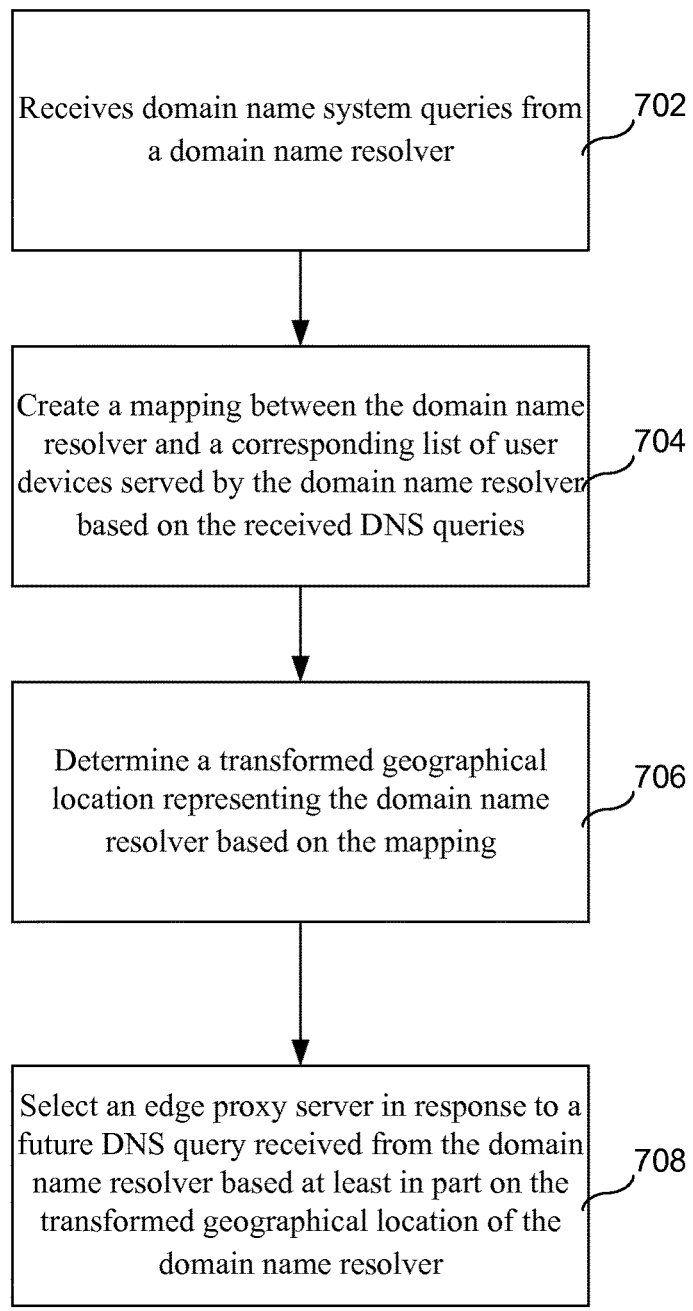
FIG. 7 illustrates a flow diagram of an embodiment of a process 700 for selecting an edge proxy server that can provide lower-latency connections to a plurality of user devices for accessing web content.

FIG. 7 illustrates a flow diagram of an embodiment of a process 700 for selecting an edge proxy server that can provide lower-latency connections to a plurality of user devices for accessing web content. Process 700 may be performed by authoritative name server 206 in the system as illustrated in FIG. 3.

At 702, domain name system queries sent from a domain name resolver are received by the authoritative name server. One of the DNS queries is sent by the domain name resolver in response to a DNS query sent by a user device querying a domain name. A unique identification token of the user device is encoded into the domain name. In some embodiments, the unique identification token of the user device is the IP address of the user device. In some embodiments, the unique identification token of the user device is a unique identifier that is converted from the IP address of the user device.

At 704, a mapping between the domain name resolver and a corresponding list of user devices served by the domain name resolver is created based on the received DNS queries. For example, a mapping is as shown by mapping 500 of FIG. 5. A client IP address associated with a DNS query received by the authoritative name server is determined. This client IP address is stored as an IP address of the domain name resolver. The queried domain name associated with a DNS query received by the authoritative name server is decoded to obtain an IP address of the user device. The geographical location of the user device is translated from the IP address of the user device using geolocation software. The geographical location of the domain name resolver is translated from the IP address of the domain name resolver using geolocation software.

At 706, a transformed geographical location representing the domain name resolver is determined based on the mapping. For example, the transformed geographical location is calculated by computing the weighted average of all the user device locations mapped to the domain name resolver.

At 708, an edge proxy server is selected in response to a future DNS query received from the domain name resolver based at least in part on the transformed geographical location of the domain name resolver. For example, when a DNS query from the resolver is received by the authoritative name server, the authoritative name server may use the transformed geographical location of the resolver to select a closest edge proxy server to serve the web content. For example, an edge proxy server that is geographically closer to transformed geographical location is selected. Referring back to FIG. 6, a user device 203 that is served by domain name resolver 204 will be connected now to edge server 602 instead of edge server 308, thereby reducing the latency between the user device and the CDN network.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of selecting an edge proxy server to serve web contents to user devices by an authoritative name server, comprising:
    receiving domain name system (DNS) queries from a domain name resolver;
    creating by the authoritative name server a list of user devices served by the domain name resolver based on the received DNS queries;
    determining by the authoritative name server a geographical location indicating geographical locations of the list of user devices served by the domain name resolver based on the created list of user devices served by the domain name resolver, wherein the geographical location indicating the geographical locations of the list of user devices served by the domain name resolver is different from a geographical location of the domain name resolver;
    wherein determining the geographical location indicating the geographical locations of the list of user devices served by the domain name resolver comprises: determining a weighted average of the geographical locations of the list of user devices served by the domain name resolver; and
    selecting by the authoritative name server an edge proxy server in response to a future DNS query received from the domain name resolver based at least in part on the determined geographical location indicating the geographical locations of the list of user devices served by the domain name resolver.

2. The method of claim 1, wherein creating the list of user devices served by the domain name resolver comprises:
    determining a client IP address associated with one of the received DNS queries and storing the client IP address as an IP address of the domain name resolver; and
    decoding from a domain name associated with the one of the received DNS queries an IP address of a user device.

3. The method of claim 2, wherein creating the list of user devices served by the domain name resolver further comprises:
    translating the IP address of the domain name resolver to a geographical location of the domain name server; and
    storing the geographical location of the domain name server with the list.

4. The method of claim 2, wherein creating the list of user devices served by the domain name resolver further comprises:
    translating the IP address of the user device to a geographical location of the user device; and
    storing the geographical location of the user device with the list.

5. The method of claim 1, wherein selecting the edge proxy server is further based in part on a geographical location associated with the edge proxy server.

6. The method of claim 1, wherein one of the DNS queries received by the authoritative name server is sent by the domain name server in response to a DNS query sent by a user device querying a domain name, and wherein a unique identification token of the user device is encoded into the domain name, and wherein the domain name is included in the DNS query received by the authoritative name server, and wherein an IP address of the user device is convertible from the unique identification token.

7. The method of claim 6, wherein the encoding of the unique identification token of the user device into the domain name is performed by a nanovisor client running on the user device.

8. The method of claim 7, wherein the nanovisor client is injected into a head section of an HTML webpage file by an edge proxy server serving the HTML webpage file to a web browser running on the user device.

9. The method of claim 7, wherein the unique identification token of the user device is received by the nanovisor client from one of a plurality of edge proxy servers in a content delivery network (CDN).

10. An authoritative name server for selecting an edge proxy server to serve web contents to user devices, comprising:
    a hardware processor; and
    a memory coupled with the processor, wherein the memory is programmed to provide the processor with instructions which when executed cause the hardware processor to:
    receive domain name system (DNS) queries from a domain name resolver;
    create a list of user devices served by the domain name resolver based on the received DNS queries;
    determine a geographical location indicating geographical locations of the list of user devices served by the domain name resolver based on the created list of user devices served by the domain name resolver, wherein the geographical location indicating the geographical locations of the list of user devices served by the domain name resolver is different from a geographical location of the domain name resolver;
    wherein determining the geographical location indicating the geographical locations of the list of user devices served by the domain name resolver comprises: determining a weighted average of the geographical locations of the list of user devices served by the domain name resolver; and
    select an edge proxy server in response to a future DNS query received from the domain name resolver based at least in part on the determined geographical location indicating the geographical locations of the list of user devices served by the domain name resolver.

11. The authoritative name server of claim 10, wherein creating the list of user devices served by the domain name resolver comprises:
    determining a client IP address associated with one of the received DNS queries and storing the client IP address as an IP address of the domain name resolver; and
    decoding from a domain name associated with the one of the received DNS queries an IP address of a user device.

12. The authoritative name server of claim 11, wherein creating the list of user devices served by the domain name resolver further comprises:
    translating the IP address of the domain name resolver to a geographical location of the domain name server; and
    storing the geographical location of the domain name server with the list.

13. The authoritative name server of claim 11, wherein creating the list of user devices served by the domain name resolver further comprises:
    translating the IP address of the user device to a geographical location of the user device; and storing the geographical location of the user device with the list.

14. The authoritative name server of claim 10, wherein selecting the edge proxy server is further based in part on a geographical location associated with the edge proxy server.

15. The authoritative name server of claim 10, wherein one of the DNS queries received by the authoritative name server is sent by the domain name server in response to a DNS query sent by a user device querying a domain name, and wherein a unique identification token of the user device is encoded into the domain name, and wherein the domain name is included in the DNS query received by the authoritative name server, and wherein an IP address of the user device is convertible from the unique identification token.

16. The authoritative name server of claim 15, wherein the encoding of the unique identification token of the user device into the domain name is performed by a nanovisor client running on the user device.

17. The authoritative name server of claim 16, wherein the nanovisor client is injected into a head section of an HTML webpage file by an edge proxy server serving the HTML webpage file to a web browser running on the user device.

18. The authoritative name server of claim 16, wherein the unique identification token of the user device is received by the nanovisor client from one of a plurality of edge proxy servers in a content delivery network (CDN).

19. A computer program product for selecting an edge proxy server to serve web contents to user devices, the computer program product being embodied in a tangible non-transitory computer readable storage medium and comprising computer instructions for:
    receiving domain name system (DNS) queries from a domain name resolver;
    creating by the authoritative name server a list of user devices served by the domain name resolver based on the received DNS queries;
    determining by the authoritative name server a geographical location indicating geographical locations of the list of user devices served by the domain name resolver based on the created list of user devices served by the domain name resolver, wherein the geographical location indicating the geographical locations of the list of user devices served by the domain name resolver is different from a geographical location of the domain name resolver;
    wherein determining the geographical location indicating the geographical locations of the list of user devices served by the domain name resolver comprises: determining a weighted average of the geographical locations of the list of user devices served by the domain name resolver; and
    selecting by the authoritative name server an edge proxy server in response to a future DNS query received from the domain name resolver based at least in part on the determined geographical location indicating the geographical locations of the list of user devices served by the domain name resolver.

* * * * *